US011199680B2

(12) United States Patent
Crowcombe et al.

(10) Patent No.: US 11,199,680 B2
(45) Date of Patent: Dec. 14, 2021

(54) OPTICAL ASSEMBLY WITH HIGH ACCURACY STABLE ALIGNMENT BETWEEN OPTICAL SURFACES

(71) Applicant: Nederlandse Organisatie voor toegepast-natuurwetenschappelijk onderzoek TNO, s-Gravenhage (NL)

(72) Inventors: William Edward Crowcombe, Rotterdam (NL); Hendrik De Man, Roosendaal (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 72 days.

(21) Appl. No.: 16/758,646

(22) PCT Filed: Oct. 26, 2018

(86) PCT No.: PCT/NL2018/050712
§ 371 (c)(1),
(2) Date: Apr. 23, 2020

(87) PCT Pub. No.: WO2019/083368
PCT Pub. Date: May 2, 2019

(65) Prior Publication Data
US 2020/0348489 A1    Nov. 5, 2020

(30) Foreign Application Priority Data
Oct. 27, 2017 (EP) ..................................... 17198817

(51) Int. Cl.
*G02B 7/182*    (2021.01)
*G02B 17/06*    (2006.01)
*B64G 1/66*    (2006.01)

(52) U.S. Cl.
CPC ....... *G02B 7/1822* (2013.01); *G02B 17/0615* (2013.01); *B64G 1/66* (2013.01)

(58) Field of Classification Search
CPC ..... G02B 7/1822; G02B 17/0615; B64G 1/66
See application file for complete search history.

(56) References Cited

U.S. PATENT DOCUMENTS

| 2005/0141112 | A1* | 6/2005 | Valenzuela | ............ G02B 7/182 |
| | | | | 359/872 |
| 2010/0073790 | A1* | 3/2010 | Yafuso | ................ G02B 17/061 |
| | | | | 359/853 |

(Continued)

FOREIGN PATENT DOCUMENTS

| EP | 0339865 A2 | 11/1989 |
| EP | 0649042 A3 | 4/1995 |

OTHER PUBLICATIONS

Comstock, "Recent Technology Advances in Diamond Machining for Spaceborne Optical Systems," Proceedings Optical Diagnostics of Living Cells II, vol. 5798, pp. 112-119, XP055470762 (May 19, 2005).

(Continued)

*Primary Examiner* — Robert E. Tallman
(74) *Attorney, Agent, or Firm* — Leydig, Voit & Mayer, Ltd.

(57) ABSTRACT

An optical assembly is manufactured by combining a first optical component with a second optical component. The optical components each comprise respective optical surfaces and alignment structures. The first optical surface is aligned with respect to the second optical surface by a connection between the alignment structures and their predefined relative positions with respect to the optical surfaces. The relative positions are determined by a high-accuracy manufacturing process such as diamond turning wherein, for each optical component, a respective alignment (Continued)

structure is manufactured together with a respect optical surface from a single work piece.

15 Claims, 7 Drawing Sheets

(56) References Cited

U.S. PATENT DOCUMENTS

2010/0284099 A1   11/2010   Guyer
2013/0294815 A1   11/2013   Barnes, IV et al.

OTHER PUBLICATIONS

Risse et al., "Development and Fabrication of a Hyperspectral, Mirror Based IR-Telescope with Ultra-Precise Manufacturing and Mounting Techniques for a Snap-Together System Assembly," Sensors, Systems, and Next-Generation Satellites XV, SPIE, vol. 8176, No. 1, pp. 1-10, XP060020140 (Oct. 6, 2011).
Sweeney, "Advanced Manufacturing Technologies for Light-Weight, Post Polished, Snap-Together Reflective Optical System Designs," Visual Communications and Image Processing, vol. 4771, pp. 144-154, XP002474908 (Jan. 1, 2002).
European Patent Office, International Search Report in corresponding International Application No. PCT/NL2018/050712, dated Mar. 22, 2019 (3 pages).

\* cited by examiner

OPTICAL ASSEMBLY WITH HIGH ACCURACY STABLE ALIGNMENT BETWEEN OPTICAL SURFACES

CROSS-REFERENCE TO RELATED APPLICATIONS

This patent application is a U.S. National Phase of PCT International Application No. PCT/2018/050712, filed Oct. 26, 2018, which claims priority to European Application No. 17198817.3, filed Oct. 27, 2017, which are both expressly incorporated by reference in their entireties, including any references contained therein.

TECHNICAL FIELD AND BACKGROUND

The present disclosure relates to a method of manufacturing an optical assembly, the optical assembly, and an optical instrument comprising the assembly, e.g. for use in a satellite.

Sub-micron alignment of optical surfaces such as mirrors is generally important to achieve high performance requirements in an optical instrument. Under some circumstances, such as during launch of a satellite with an optical instrument, the alignment needs to withstand significant vibration. At the same time, cost of production, complexity, and weight should be considered. It is with these and other considerations that the current methods and systems have been developed.

SUMMARY

One aspect of the present disclosure relates to a method of manufacturing an optical assembly. Optical components are formed by rotating respective workpieces around a rotational axis while shaping their material to form respective optical surfaces having respective curvatures which are rotation symmetric around respective optical axes of the optical surfaces coinciding with the rotational axis. In the same rotation based manufacturing process, respective alignment structures are formed having predefined relative positions with respect to curvatures of the optical surfaces. The optical components thus formed are combined by connecting respective alignment structures.

Advantageously, various coordinates of the optical surfaces of different components can be aligned by the connection between the alignment structures and their predefined relative positions with respect to the optical surfaces. For example, by matching radial offsets in different components between respective optical axes and (concentric) edges of respective alignment structures, the optical axes of different components can be aligned to coincide. By providing the optical surfaces with rotation symmetric curvatures, the alignment can be insensitive to limited rotation along a tangential coordinate. Also axial alignment can be achieved by setting a predefined height of connecting surfaces of the optical components or their alignment structures with respect to the alignment point of the curvatures defining the optical surfaces. For example, by aligning both the radial and axial coordinates, focal points of different optical surfaces, e.g. parabolic mirrors, can be overlapped e.g. to form a beam expander or other instrument. It will be appreciated, that an accuracy of the alignment may be determined by the rotation based manufacturing process. For example, both the optical surfaces and alignment structures can be shaped by high precision diamond turning, also referred to as single-point diamond turning (SPDT), which can achieve sub-micron precision. And because the alignment structure is integral with the optical surface (made from one piece), the alignment is much more robust than e.g. using intermediate alignment structures. It can be especially robust when the optical assembly is designed to directly reflect the light beam between the optical surfaces of interconnected components, without other reflecting surfaces in between.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
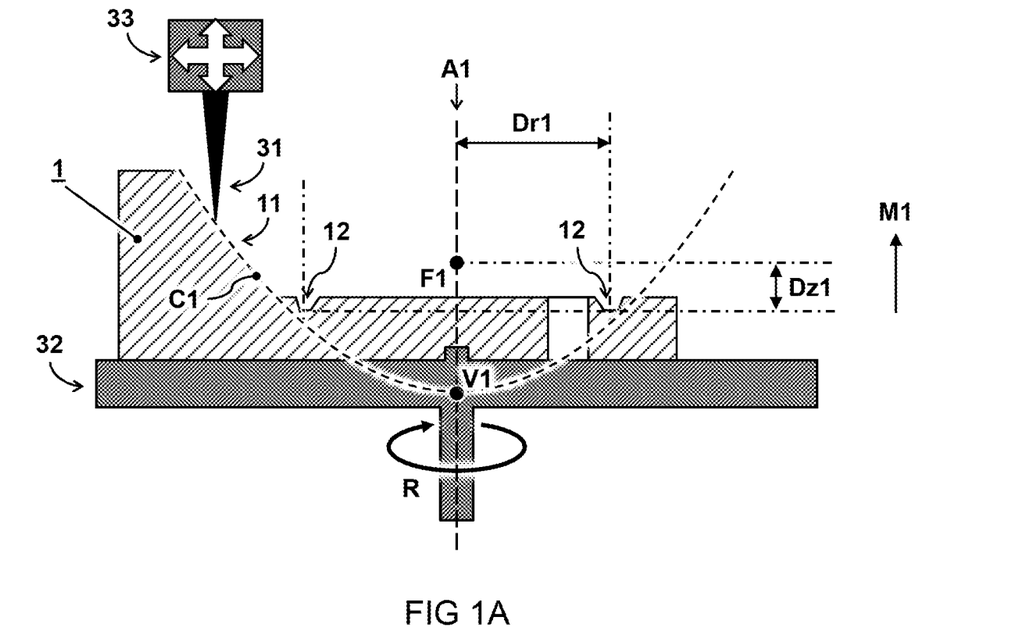
FIGS. 1A and 1B schematically illustrate an embodiment for manufacturing optical components to be combined in an optical assembly.
Figure 1B:
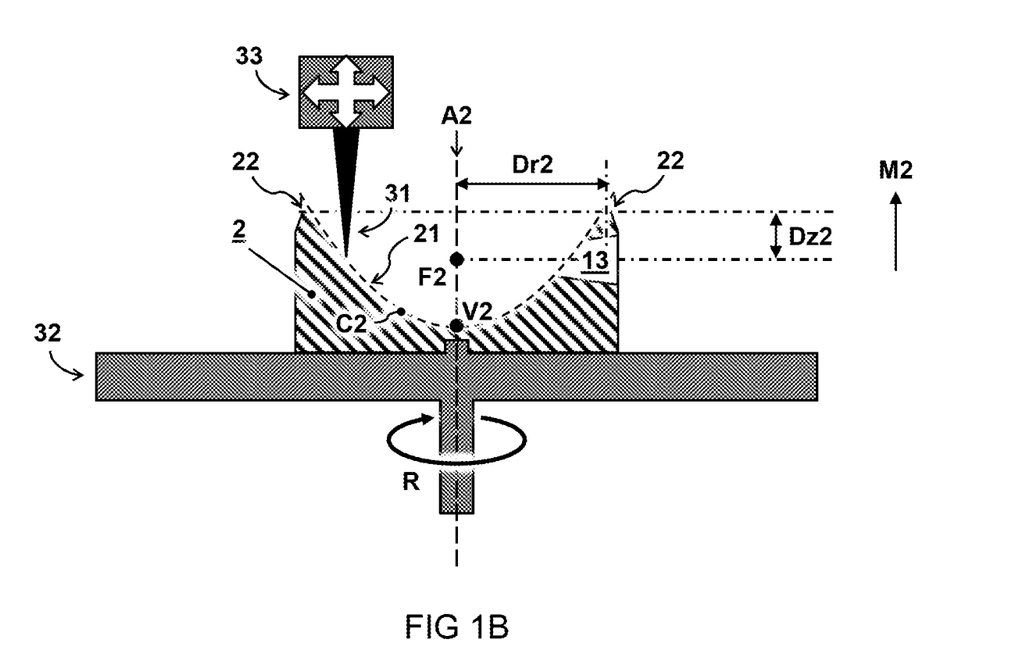

FIGS. 1A and 1B schematically illustrate an embodiment for manufacturing optical components to be combined in an optical assembly.

As illustrated by FIG. 1A, one embodiment comprises forming a first optical component by rotating a first workpiece 1 around a rotational axis R while shaping its material. The shaping may include forming a first optical surface 11 having a first curvature C1 which is rotation symmetric around a first optical axis A1 of the first optical surface 11 coinciding with the rotational axis R. The shaping may further include forming a first alignment structure 12 having a predefined first relative position Dr1,Dz1 with respect to the first curvature C1 of the first optical surface 11.

As illustrated by FIG. 1B, a second optical component can be formed in some embodiments by rotating a second workpiece 2 around the rotational axis R while shaping its material. The shaping may include forming a second optical surface 21 having a second curvature C2 which is rotation symmetric around a second optical axis A2 of the second optical surface 21 coinciding with the rotational axis R. The shaping may further include forming a second alignment structure 22 having a predefined second relative position Dr2,Dz2 with respect to the second curvature C2 of the second optical surface 12

Preferably, the shaping of the respective optical surface 11 or 21 and the respective alignment structure 12 or 22 takes place in a single manufacturing process, e.g. without removing the respective optical component from the machine (indicated here by numeral 31,32,33) between manufacturing of the respective optical surface and alignment structure. In this way the machine may better maintain relative alignment for each optical component.

In some embodiment, the workpieces 1,2 are rotated by a lathe 32 or derivative machine tools, e.g. turn-mills, rotary transfers. For example, the lathe 32 comprises a turn table or other rotating structure configured to hold or clamp the workpieces 1,2 while rotating. In some cases, e.g. wherein a center of mass of the optical component to be manufactured is offset (far) from the rotational center, such as the component 20 here, the lathe (or workpiece) may be provided with a counterweight during manufacturing, to at least partly compensate for this offset and allow a smoother rotation (without wobbling).

In a preferred embodiment, the workpieces 1,2 are shaped by a cutting tool 31, e.g. tool bit. Alternatively, or in addition to a physical tool bit, also other cutting tools may be envisaged, e.g. a (focused) laser beam configured to cut away material e.g. by ablation. Alternatively, or in addition to a cutting tool, also other devices and methods may be envisaged to shape the material of workpieces, e.g. additive manufacturing or 3D printing. It can even be envisaged that optical components 10,20 are manufactured by molding from respective work pieces that are shaped by any of the processes described herein. For example, the optical surfaces and alignment structures are shaped as negatives in a respective mold. After manufacturing of respective shaped, also further processes may be applied e.g. to the optical surfaces for achieving desired optical function. For example, the optical surfaces may be coated with a metal, e.g. gold or aluminum, layer for achieving desired reflectivity in a specific wavelength domain. Processing may include electroless nickel plating (NiP). Also other, e.g. multiple, layers may be deposited, e.g. to form dielectric coated mirrors also referred to as Bragg mirrors. Coating may also be applied to other surfaces, e.g. adhesive.

In some embodiments, a relative position of the cutting tool 31 with respect to the workpieces 1,2 is controlled by an actuator 33. Preferably, the cutting tool 31 is moved with sub-micron or even nanometer precision e.g. by a combination of electric motors and piezoelectric actuators. For example, the motion of the cutting tool 31 is controlled by a list of coordinates generated by a computer, also referred to as computer numerical control (CNC).

It will be appreciated that an accuracy of the relative positions Dr1,Dz1;Dr2,Dz2 of the respective alignment structures 12,22 with respect to the (curvatures of the) optical surfaces 11,21 can be determined by an accuracy of the manufacturing method. Preferably, the relative positions Dr1,Dz1;Dr2,Dz2 between the alignment structures 12,22 and respective optical surfaces 11,21 are manufactured with sub-micron accuracy. Accordingly, in the combined optical assembly 100 the optical axes A1,A2 and/or focal points F1,F2 may overlap within sub-micron accuracy. For example, the distance between the aligned optical axes A1,A2 or between the aligned focal points F1,F2 in the optical assembly 100 is less than hundred micrometer, less than ten micrometer, preferably less than one micrometer, less than a tenth of a micrometer, less than a hundredth of a micrometer, or even sub-nanometer, e.g. between 0.1 to a few micron.

In a preferred embodiment, the optical surfaces 11,21 and alignment structures 12,22 are shaped by a high-accuracy manufacturing process such as diamond turning, also referred to as single-point diamond turning SPDT. For example, SPDT uses a diamond-tipped tool bit to cut away material from the workpieces 1,2. In principle, also other sufficiently hard materials can be used as tool bit, depending on the material of the workpieces. Typically diamond turning is a multi-stage process. Initial stages of machining are carried out using a series of CNC lathes of increasing accuracy. A diamond-tipped lathe tool is used in the final stages of the manufacturing process to achieve sub-nanometer level surface finishes and sub-micrometer form accuracies. The surface finish quality is typically measured as the peak-to-valley distance of the grooves left by the lathe and cutting tool. The form accuracy is typically measured as a mean deviation from the ideal target form. Similar processes may be used for other processes of shaping the work pieces.

Figure 2A:
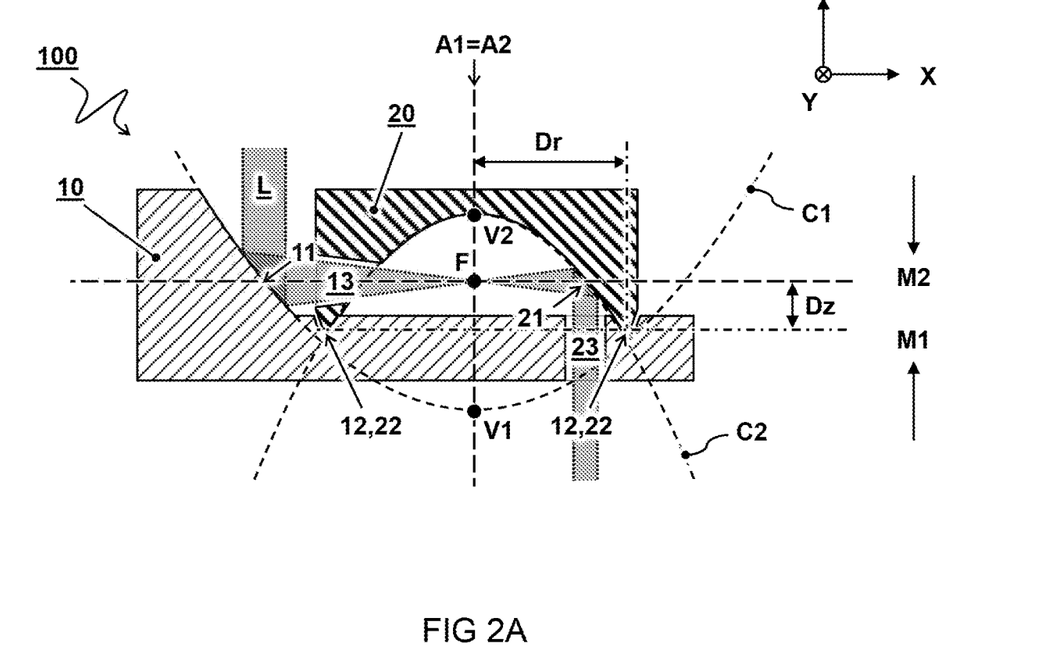
FIG. 2A illustrates an embodiment of an optical assembly which may be formed by combining optical components as manufactured in FIGS. 1A and 1B.

FIG. 2A illustrates an embodiment of an optical assembly 100 which may be formed by combining the components manufactured in FIGS. 1A and 1B. For example, one embodiment comprises combining the first optical component 10 with the second optical component 20 by (directly) connecting the first alignment structure 12 with the second alignment structure 22. Advantageously, the first optical surface 11 is aligned with respect to the second optical surface 21 by the connection between the alignment structures 12,22 and their predefined relative positions Dr, Dz with respect to the optical surfaces 11,21.

The alignment structures may be directly or indirectly aligned with predefined distances or angles with respect to the optical surfaces anchor alignment points/lines defined by their curvatures such as a focal or apex point, or a (central) axis of symmetry. In the embodiment shown, the alignment structures alignment structures 12,22 are directly connected to each other, which may provide greater alignment precision than an indirect connection, e.g. via an intermediate structure.

In one embodiment, such as shown in FIG. 1A, the first relative position between the optical surface and alignment structure includes a first radial offset Dr1 of the first alignment structure 12 with respect to the first optical axis A1 of the first curvature C1. In another or further embodiment, such as shown in FIG. 1A, the second relative position between the optical surface and alignment structure includes a second radial offset Dr2 of the second alignment structure 22 with respect to the second optical axis A2 of the second curvature C2. In a preferred embodiment, the first radial offset Dr1 matches the second radial offset Dr2 to align the first optical axis A1 to coincide with the second optical axis A2 in the optical assembly 100 when the first alignment structure 12 is connected to the second alignment structure 22 e.g. as shown in FIG. 2A.

In some embodiments, such as shown in FIG. 1A, the first relative position includes a first axial offset Dz1 of the first alignment structure 12 with respect to a first alignment point (e.g. F1 or V1) defined by the first curvature C1. In other or further embodiments, such as shown in FIG. 1B, the second relative position Dr2,Dz2 includes a second axial offset Dz2 of the second alignment structure 22 with respect to a second alignment point (e.g. F2 or V2) defined by the second curvature C2. In a preferred embodiment, the first axial offset Dz1 matches, or has a predetermined difference, with the second axial offset Dz2 to align the first optical surface 11 with respect to the second optical surface 21 along a coordinate Z on the coinciding optical axes A1,A2.

In some embodiments, the first curvature C1 defines a first focal point F1 of the first optical surface 11 and/or the second curvature C2 defines a second focal point F2 of the second optical surface 21. For example, an optical surface can be defined by a parabola equation $Z=a \cdot (X-Xv)^2 + Zv$, where "a" gives the height to width ratio of the parabola having its vertex "V" (highest or lowest point) at coordinates [Xv, Zv], the focus F is at coordinates [Xv, Zv+1/(4a)]. For example, an optical surface can be defined by an ellipse equation $(X-Xc)^2/a^2 + (Z-Zc)^2/b^2 = 1$, where "a" is the higher radius and "b" the lower radius of the ellipse having its center at [Xc, Zc], each focus "F" (there are two) is distanced from the center (along the higher radius) by "c" which can be calculated using $c^2 = a^2 - b^2$. Instead of the coordinate X, a radial coordinate may be substituted to obtain a radially symmetric curvature. For example a curvature $Z = a \cdot R^2$ may define a rotation symmetric parabola with its vertex at [0,0] and focus at [0,1/(4·a)]. Also other curvatures may define respective vertices and/or focal points.

In a preferred embodiment, such as illustrated in each of FIGS. 2A,2B,3A,3B, the first focal point F1 is aligned to coincide with the second focal point F2. For example, the first radial offset Dr1 matches the second radial offset Dr2 and the first axial offset Dz1 between the first focal point F1 and the first alignment structure 12 matches the second axial offset Dz2 between the second focal point F2 and the second alignment structure 22.

With reference again to the embodiment of FIG. 2A, the optical surfaces 11,21 may be configured to reflect a light beam L, e.g. forming parabolic mirrors. Alternatively, or in addition, also other optical surfaces such as refractive surfaces may be envisaged. For example, one or more of the optical surfaces may form a lens (not shown), grating (not shown), et cetera. In a preferred embodiment, the optical assembly 100 is configured to reflect a light beam L from the first optical surface 11 directly to the second optical surface 21 without intermediate reflecting surface. In this way the beam alignment of the optical surfaces 11,21 is completely fixed.

Typically, the first curvature C1 has a first vertex V1 on the first optical axis A1 and/or the second curvature C2 has a second vertex V2 on the second optical axis A2. In the embodiment of FIG. 2A, a coinciding focal point F of the first curvature C1 and the second curvature C2 is between the first vertex V1 and the second vertex V2 in the combined optical assembly 100. This is the typically case for two oppositely oriented curvatures C1,C2 as shown, e.g. a first parabola forming the first curvature C1 with a first vertex V1 at its minimum and a second parabola forming the second curvature C2 with a second vertex V2 at its maximum (here along the Z axis). In the embodiment shown, the optical assembly 100 is configured to maintain a general direction of the light beam L, i.e. the outgoing light beam travels in the same direction as the incoming light beam (here both traveling in the negative Z axis direction).

In some embodiments such as FIG. 2A, the optical assembly 100 comprises a cavity formed between the first optical component 10 and the second optical component 20. Typically, the cavity is formed within an intersection of the first curvature C1 and the second curvature C2. In other or further embodiments, the first optical component 10 and/or second optical component 20 comprise respective beam passages 13,23 to pass a light beam L between the first optical surface 11 and second optical surface 21 and/or between the cavity and external surroundings. For example, the cavity is formed between the second optical surface 21 and a plate which together with the first optical surface 11 forms a monolithic piece of the first optical component 10.

In some embodiments, the first workpiece 1 and the second workpiece 2 are shaped from a respective manufacturing direction M1,M2, e.g. shown in FIGS. 1A and 1B as the direction from which a shaping tool 31 operates on the workpieces 1,2. In embodiment such FIGS. 2A and 2B, in the combining of the first optical component 10 and second optical component 20 to form the optical assembly 100, one of the optical components 10,20 is flipped upside down such that the manufacturing directions M1,M2 of the first optical component 10 and second optical component 20 face each other. Alternative to a shaping tool, e.g. cutting bit, working from one direction, the tool may work from a range of different directions either on one side of the work piece or two different sides, or even from more than two sides, e.g. front, back and side. Alternatively, to using one tool, multiple tools can be used sequentially or at the same time, working from the same direction, or different directions.

In some embodiments, such illustrated by FIG. 2A, the first curvature C1 is defined by a parabolic shape rotated around its central axis of symmetry coinciding with the first optical axis A1 and defining a first focal point F1 and a first vertex V1. In some embodiments such as FIG. 2A, the second curvature C2 is defined by a (different) parabolic shape rotated around its central axis of symmetry coinciding with the second optical axis A2 and defining a second focal point F2 and a second vertex V2. Because the parabolic shapes are preferably different, a distance between the first focal point F1 and the first vertex V1 is larger than a distance between the second focal point F2 and the second vertex V2. Combining parabolic having different focal distances typically means that a light beam L may change size while traversing the assembly. Accordingly, the optical assembly 100 form or be part of an optical instrument such as a telescope and/or beam expander. For example, as shown, the optical assembly 100 is configured to receive a collimated light beam L with a first diameter, expand or contract a diameter of the light beam and send out a collimated light beam with a second diameter, different from the first diameter.

Figure 2B:
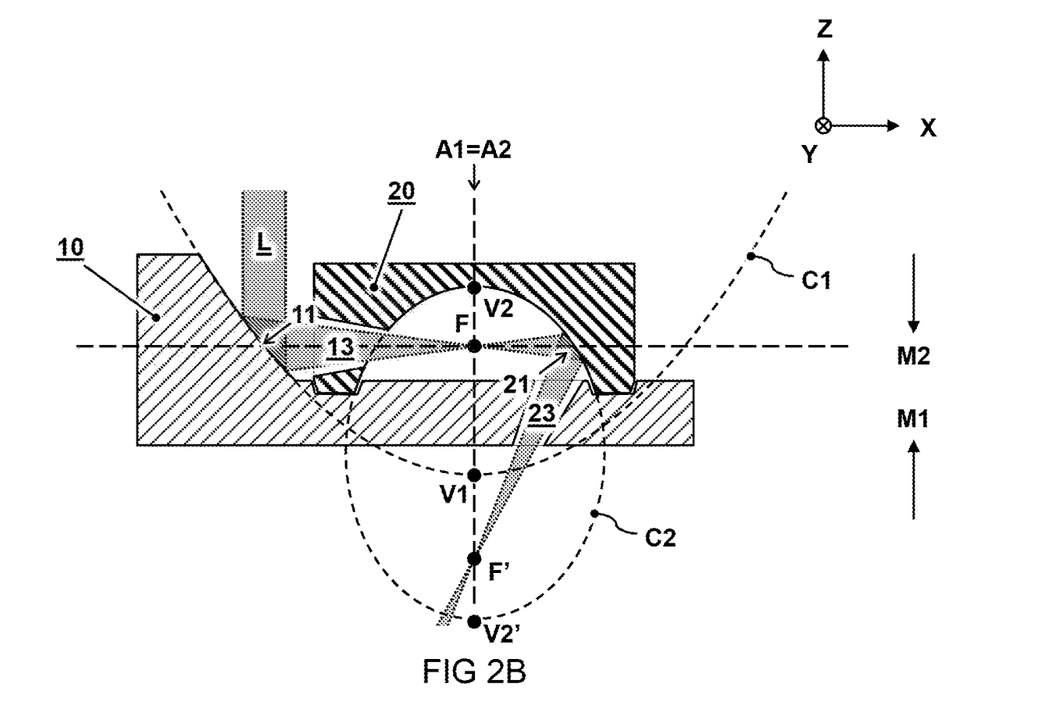
FIG. 2B illustrates another embodiment of an optical assembly with a combination of parabolic and elliptical mirrors.

In some embodiments, such illustrated by FIG. 2B, the first and/or second curvature C1,C2 is defined by an ellipsoid shape rotated around its (major) axis of symmetry coinciding with the first optical axis A1 and defining a respective primary focal point F and (closest) vertex V2. For example, an optical surface 21 defined by the ellipsoid is configured to refocus a light beam originating from its primary focal point F to its secondary focal point F', as shown. In some embodiments, the primary focal point of a second optical surface 21 coincides with a focal point F of a parabolic curve C1 defining the first optical surface 11.

Also other types of curves can be used to define the optical surfaces 11,21, including spherical and aspherical surfaces, preferably shapes defining respective focal points such as parabolic, ellipsoid, or even hyperbolic shapes. Also other rotation symmetric shapes can in principle be used such as cylindrical, toroidal, and/or cone shaped surfaces depending on the optical applications. Also combinations of these shapes can be used. And while the present embodiments show optical assemblies with two optical surfaces 11,12, also more than two surfaces can be provided. For example, an optical component may comprise one, two, or more distinct optical surfaces, i.e. surfaces defined by distinct curvatures, typically wherein each curvature is continuous and continuously differentiable. Also more than two optical components may be combined, e.g. three components may be combined wherein a first set of alignment structures aligns the first and second component and a second set of alignment structures aligns the first and third component, or the second and third component. In this way, an optical assembly may be built from two, three, four or more components, each of the optical surfaces being aligned by respective alignments structures and/or by physical connection of multiple optical surfaces being shaped from one work piece.

Figure 3A:
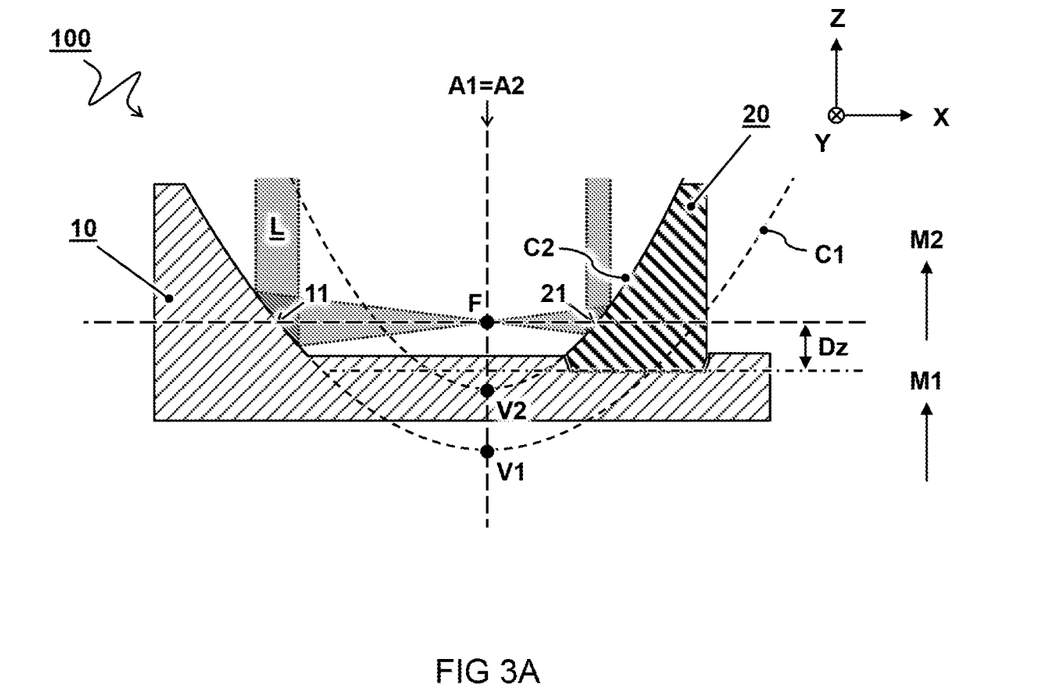
FIG. 3A illustrates another embodiment of an optical assembly, wherein the curvatures of the optical surfaces both face upward.

FIG. 3A illustrates another embodiment of an optical assembly, wherein the curvatures of the optical surfaces both face upward.

In some embodiments, as shown, the optical assembly 100 is configured to reflect back a light beam L to the direction it was coming from, i.e. the outgoing light beam travels in the back in the direction (here along the Z axis direction) opposite the direction of the incoming light beam (here in the negative Z axis direction). Typically, the first curvature C1 has a first vertex V1 on the first optical axis A1 and the second curvature C2 has a second vertex V2 on the second optical axis A2. In the embodiment of the combined optical assembly 100, as shown, the second vertex V2 is between the first vertex V1 and a coinciding focal point F of the first curvature C1 and the second curvature C2. In some embodiments, as shown here, a distance between the first vertex V1 and coinciding focal point F is larger that a distance between the second vertex V2 and the coinciding focal point F (or vice versa). In other words, the first optical surface 11 may typically have a different curvature and/or focal distance than the second optical surface 21.

Figure 3B:
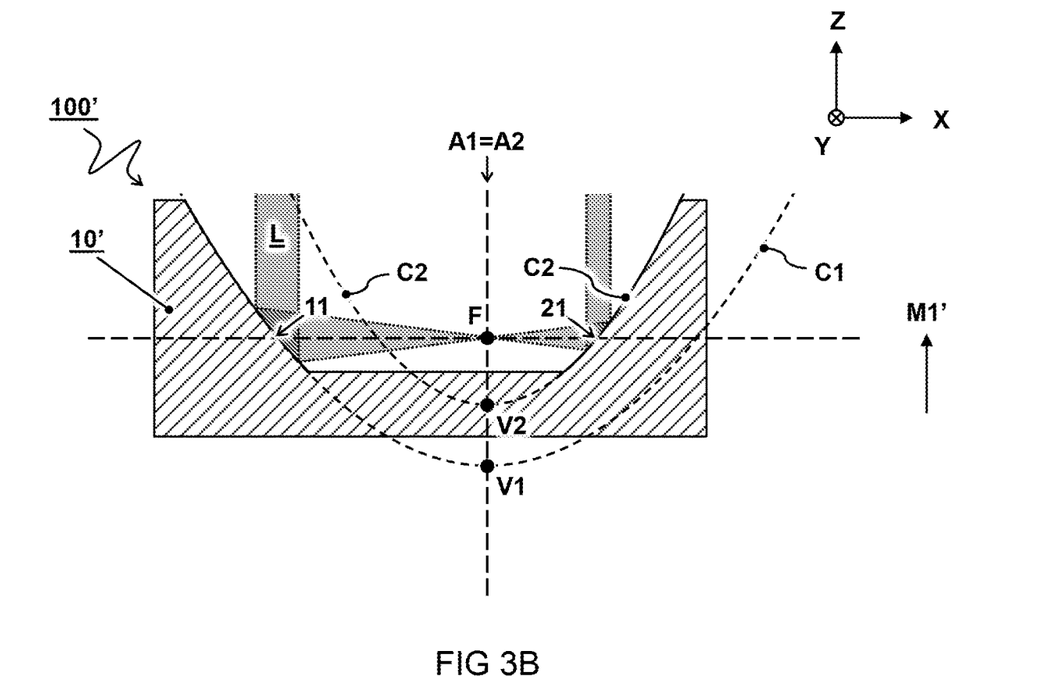
FIG. 3B illustrates an embodiment wherein one optical component comprises multiple optical surfaces.

FIG. 3B illustrates an embodiment wherein one optical component 10' comprises multiple optical surfaces 11,12. In one embodiment, as shown, at least one optical component 10', manufactured from a single work piece, comprises two, or more, distinct optical surfaces 11,21. In some embodiments, the optical component 10' comprises an alignment structure to couple with second optical component (not shown). Alternatively, it can be envisaged that the optical component 10' forms a monolithic optical assembly 100' by itself with an interconnected two or more distinct optical surfaces 11,21. Such a monolithic structure may not need alignment structures or further optical components to be connected thereto. For example, as shown, a monolithic optical assembly 100' may comprise at least two distinct optical surfaces configured to project a light beam directly from the first optical surface 11 to the second optical surface 21 without intermediate optical surfaces. In this way the distinct optical surfaces 11,21 may be accurately aligned and with great stability because they are made from a single workpiece. Preferably, the optical surfaces 11,21 of the monolith assembly have different curvatures with a coinciding focal point. For example, the curvatures of two different parabolas may have a common focal point and together function as a (back reflecting) telescope or beam expander.

Figure 4A:
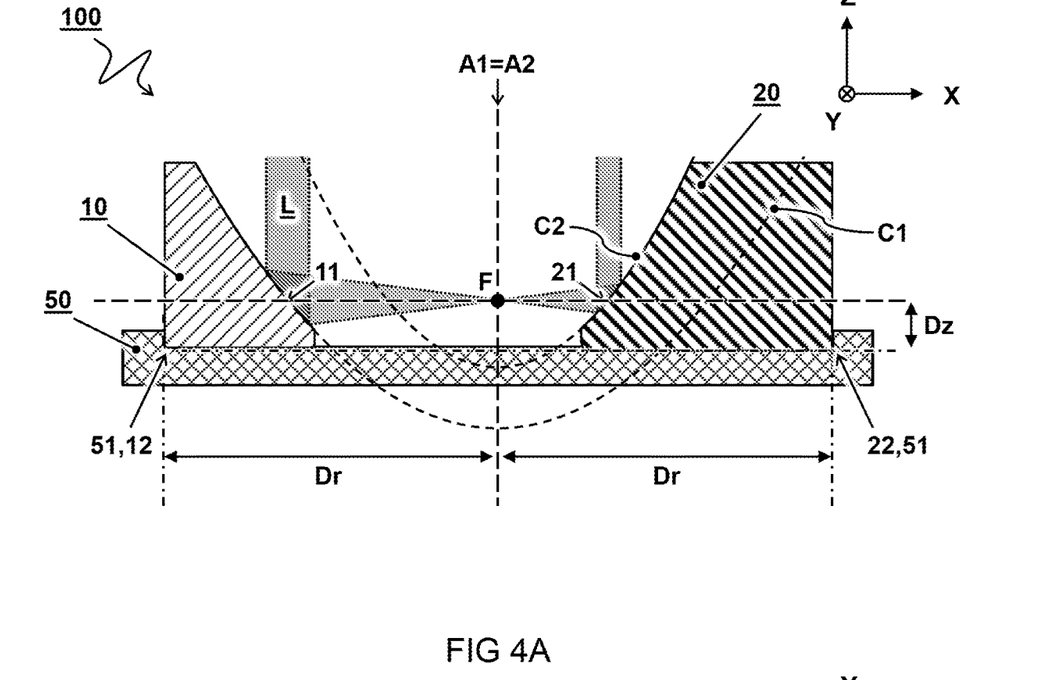
FIGS. 4A and 4B illustrate a cross-section and top view of an embodiment of an optical assembly wherein the optical surfaces are aligned via an intermediate structure.
Figure 4B:
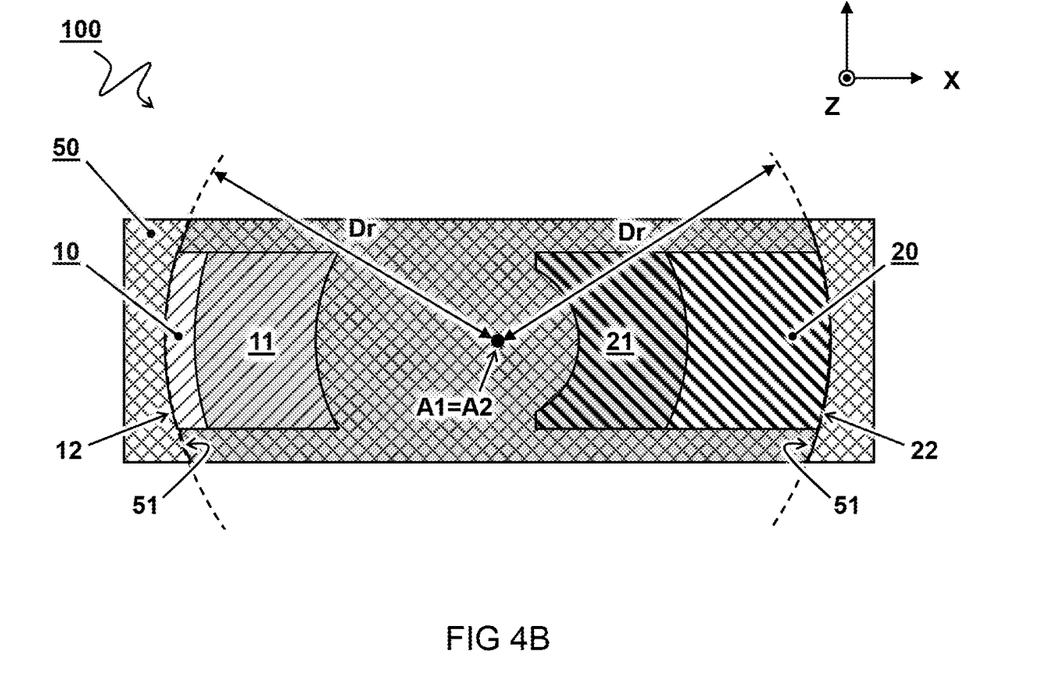

FIGS. 4A and 4B illustrate a cross-section and top view of another embodiment of an optical assembly 100. Some embodiment, e.g. as illustrated here, may comprise combining the first optical component 10 with the second optical component 20 by (indirectly) connecting the first alignment structure 12 with the second alignment structure 22 via an intermediate structure 50. The first optical surface 11 is thus aligned with respect to the second optical surface 21 by the indirect connection between the alignment structures 12,22 and their predefined relative positions Dr,Dz with respect to the optical surfaces 11,21.

In a preferred embodiment, the intermediate structure 50 is formed by the same manufacturing process as the optical components 10,20, e.g. all components 10,20,50 are manufactured by single point diamond turning or similar rotation based process. In the embodiment shown, the intermediate structure 50 comprises a circular edge 51 which can act as an intermediate alignment structure. For example, the edge is disposed at a radial distance Dr and the circular (outer) edges of the optical components 10,20 form the alignment structures 12,22 which can be pushed against the circular edge 51. This can have similar advantages as described for the other embodiment, e.g. wherein the radial alignment is highly accurate while the tangential may allow some variation due to the circular symmetry of the optical surfaces 11,21 and alignment structures alignment structures 12,22, and 51. It will be appreciated that the circular alignment structures on the optical components 10,20 and/or intermediate structure 50 can also be arranged at other radial distances than shown. For example, the intermediate structure 50 may comprise two circular edges with different radii (not shown) e.g. both concentric with the center of the intermediate structure 50 to coincide with the optical axes A1=A2 of the optical components 10,20 to be aligned. Alignment can occur with an inner radial edge, outer racial edge, or both.

Figure 5A:
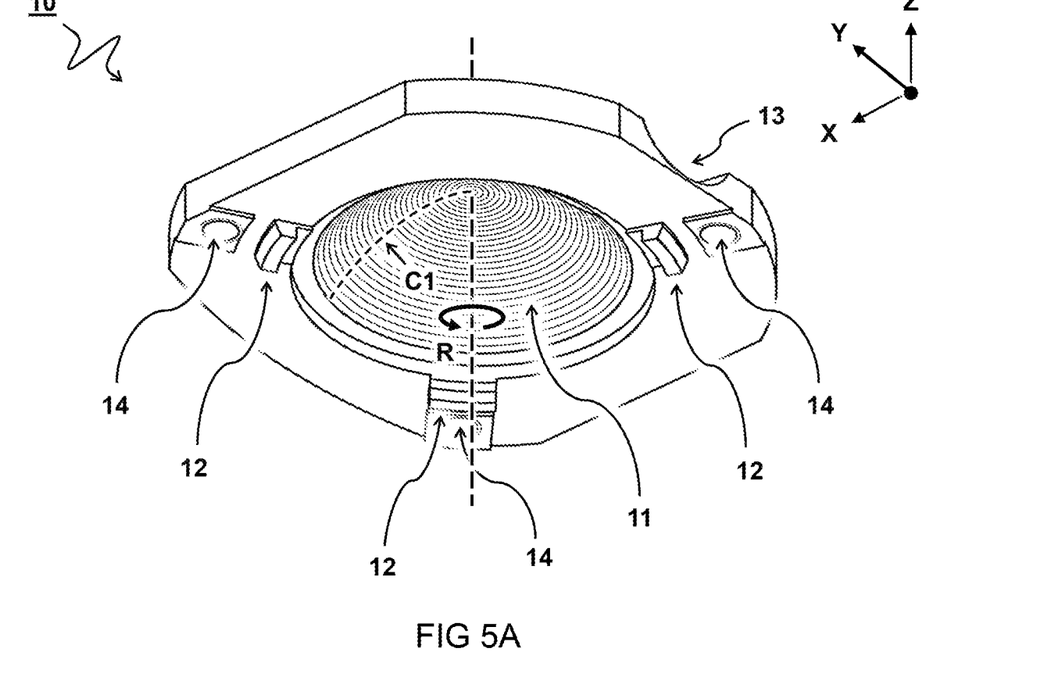
FIGS. 5A and 5B illustrate a perspective bottom and top view of a first optical component.
Figure 5B:
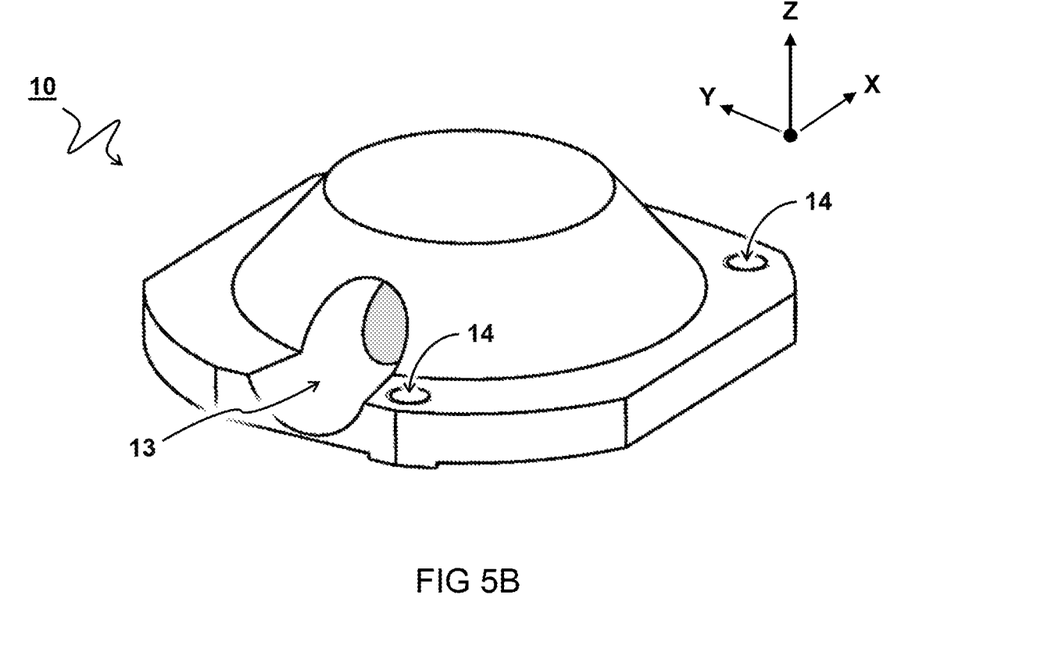
Figure 6A:
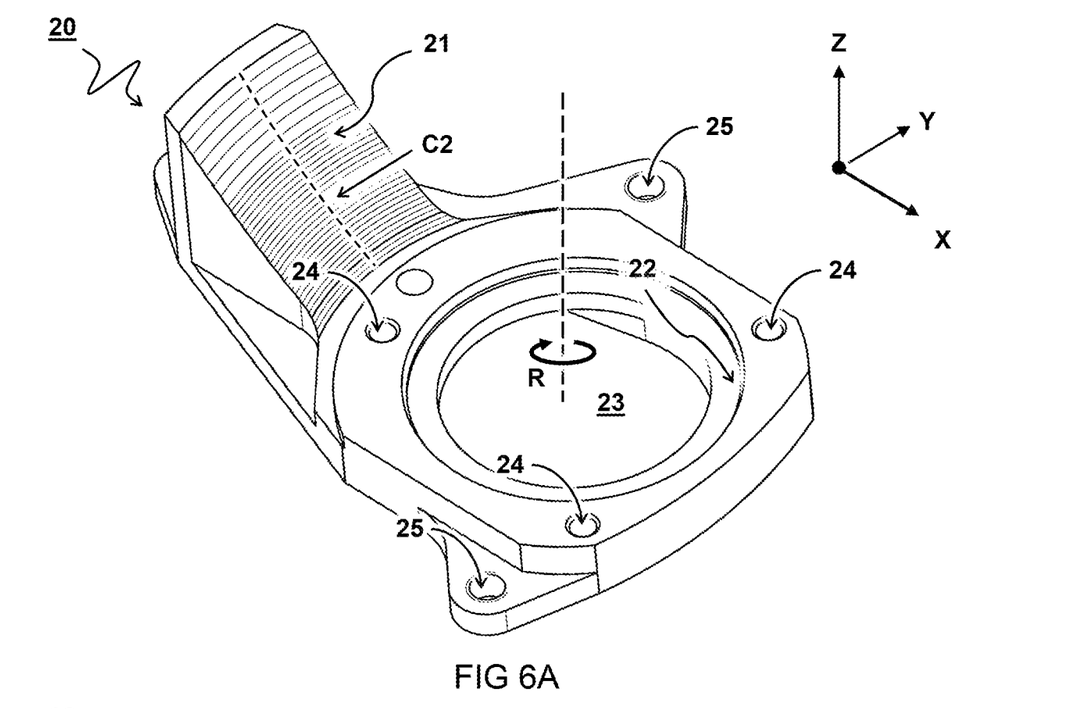
FIGS. 6A and 6B illustrate a perspective bottom and top view of a corresponding second optical component.
Figure 6B:
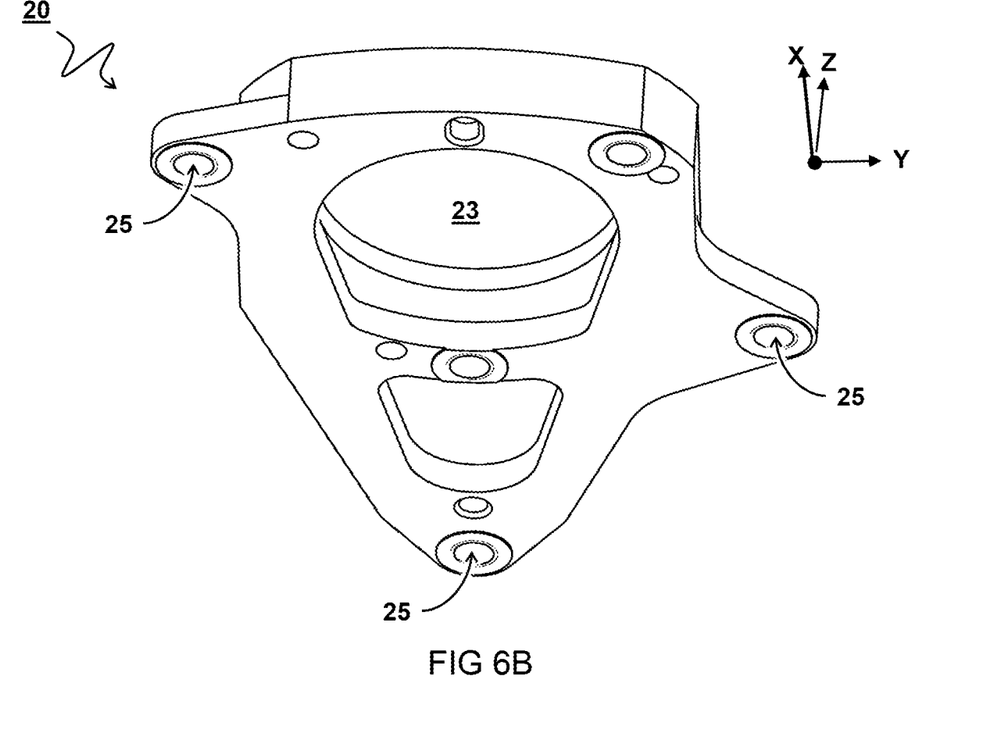
Figure 7A:
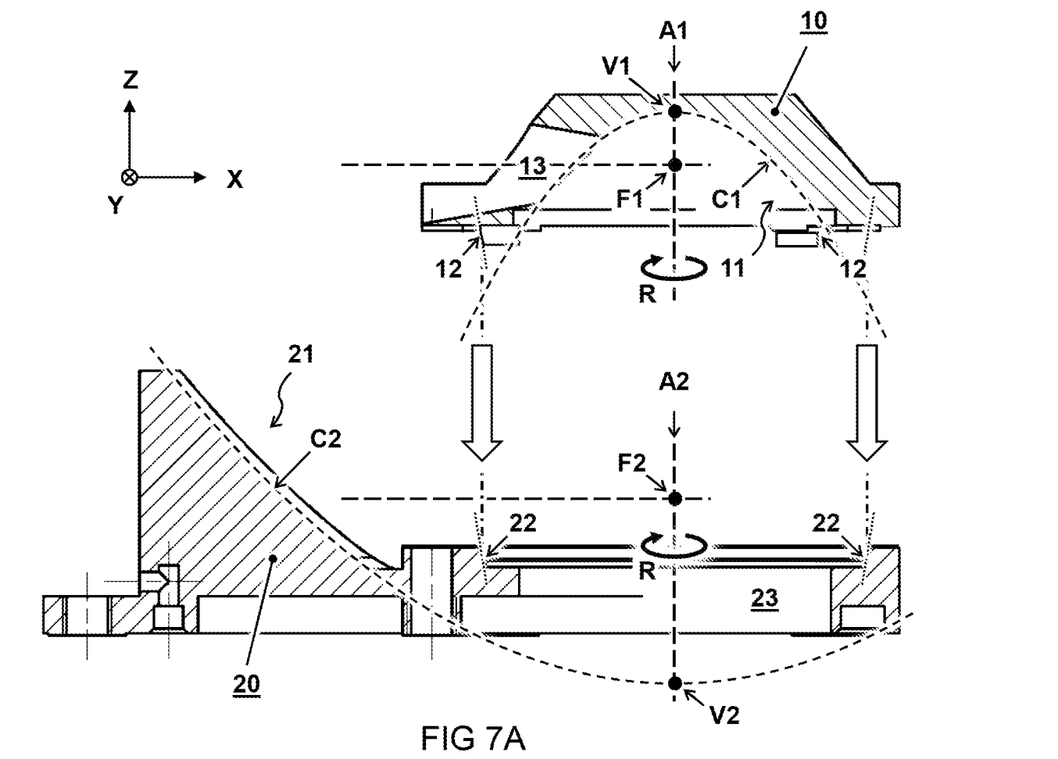
FIGS. 7A and 7B illustrate a cross-section views of the optical components of FIGS. 5A,5B,6A,6B, and how they may function together in an optical assembly.
Figure 7B:
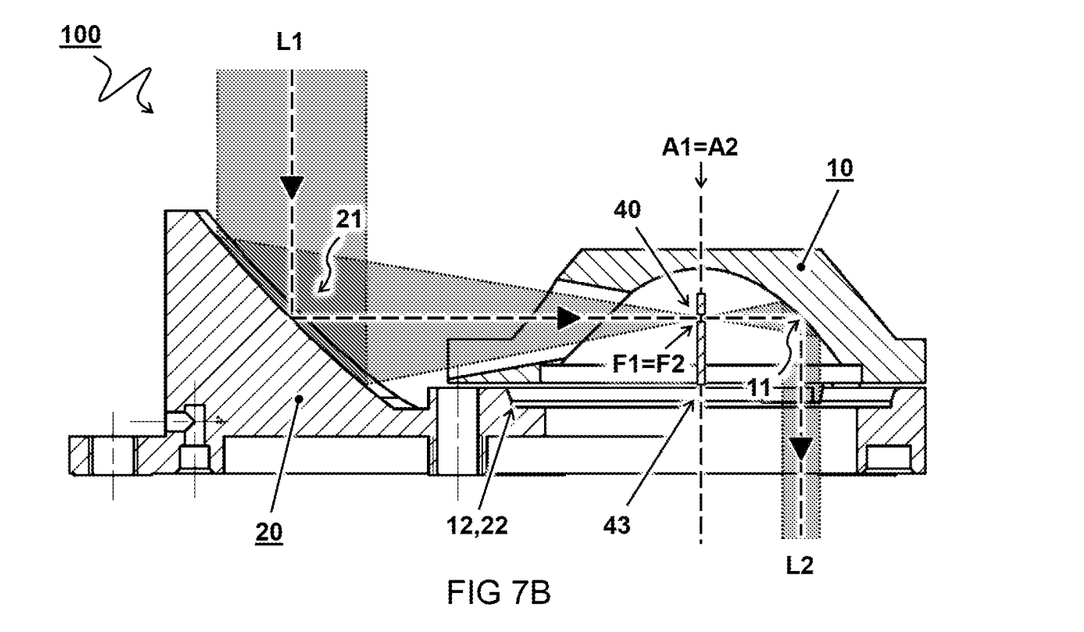

FIGS. 4-6 illustrate CAD drawings of embodiment for a telescope/beam expander similar to FIG. 2A. FIGS. 5A and 5B illustrate a perspective bottom and top view of a first optical component 10. FIGS. 6A and 6B illustrate a perspective bottom and top view of a corresponding second optical component 20. FIGS. 7A and 7B illustrate a cross-section views of the optical components 10,20 and how they may function together in an optical assembly 100;

With reference to FIGS. 5A and 6A, the optical surfaces 11,21 may comprise concentric micro-grooves (concentric around the optical axis coinciding with the rotational axis R). The micro-grooves are highly exaggerated in the current figures for illustrative purposes and may normally be invisible to the naked eye. Typically the micro-grooves have sub-micron, e.g. down to nanometer scale, peak-to-valley height differences or roughness. This may e.g. be detectable with a precision microscope or optical means such as diffraction measurements. As also illustrated by these figures, the alignment structures 12,22 may comprise edges that are concentric with the optical axes of the respective optical surfaces 11,21. It will be appreciated that alignment can be mostly invariant to rotation around the rotational axis R coinciding with the optical axis of the optical surfaces, because the optical surfaces are rotationally symmetric around that axis. Accordingly, the alignment structures 12,22 are preferably radially fixed, while some tangential, in the order of a few micron freedom may be allowed.

In some embodiments, as illustrated e.g. by FIGS. 5A and 6A, one or both of the alignment structures 12,22 comprises one or more circular rims and/or grooves. Preferably, at least one of the circular rims and/or grooves has a certain tangential extent, that is extends over part of the circle, e.g. extending more than one degree (plane angle), preferably more than three degrees, more than five degrees, more than ten degrees, or even extending around the whole circle. In a preferred embodiment, at least one of the alignment structures 12 comprises at least two connectors at one radial coordinate to fixate the radial alignment optionally allowing some rotation along a tangential (round going) direction. In a more preferred embodiment, at least one of the alignment structures 12 comprises at least three connectors preferably equidistantly distributed around a circle concentric with the rotational axis R. In other or further embodiments, as shown, at least one of the alignment structures 12 comprises a tapered structure, preferably tapered inward, for helping to center the first optical component 10 with respect to the second optical component 20.

In some embodiments, as illustrated e.g. by FIGS. 5B and 6B, the optical components 10,20 comprise respective interconnecting fixation structures 14,24 such as screw holes to screw the components together. It will be appreciated that the interconnecting fixation structures 14,24 are separate here from the alignment structures 12,22. For example, the alignment structures 12,22 are used for precise radial and axial alignment of the components 10,20 while the interconnecting fixation structures 14,24 are used for possibly less stringent tangential alignment, e.g. to align the apertures 13 in the first optical component 10 with respect to the second optical surface 21 of the second optical component 20.

In one embodiment, e.g. as illustrated in FIG. 7B, the optical assembly 100 comprises an intermediate field stop 40. For example, the intermediate field stop 40 comprises a pinhole centered on a focal point F1=F2 of the first optical surface 11 and/or second optical surface 21. In a preferred embodiment, one or both of the first optical component 10 and/or second optical component 20 comprises a third alignment structure 43 for aligning the (pinhole of the) intermediate field stop 40 with respect to the (common or individual) focal point. For example, the intermediate field stop 40 may help to filter stray light entering an optical system and/or used for shaping a phase front of the light beam L.

In some aspects, e.g. as illustrated with reference to FIGS. 7A and 7B, the present disclosure provides an optical assembly 100. The optical assembly 100 comprises a first optical component 10 combined with a second optical component 20. The first optical component 10 comprises a first optical surface 11 having a first curvature C1 which is rotation symmetric around a first optical axis A1 of the first optical surface 11, and a first alignment structure 12 having a predefined first relative position Dr1,Dz1 with respect to the first curvature C1 of the first optical surface 11. The second optical component 20 comprises a second optical surface 21 having a second curvature C2 which is rotation symmetric around a second optical axis A2 of the second optical surface 21, and a second alignment structure 22 having a predefined second relative position Dr2,Dz2 with respect to the second curvature C2 of the second optical surface 12. Due to the manufacturing process, as described herein, the optical components 10,20 each comprise a monolithic structure, i.e. are built from one piece (the respective work piece).

In the optical assembly 100 as illustrated by FIG. 7B, the first alignment structure 12 is connected with the second alignment structure 22. In this way the first optical surface 11 is aligned with respect to the second optical surface 21 by the connection between the alignment structures 12,22 and their predefined relative positions with respect to the optical surfaces 11,21. Due to some manufacturing processes as described herein, the optical surfaces 11,21 may comprise micro-groove structures concentric around the respective one or more optical axes A1,A2 (may be invisible to the naked eye but detectable by microscopic instruments). Furthermore, the alignment structures 12,22 may comprise corresponding concentric edges. In some aspects, the present disclosure may also provide an optical instrument comprising the optical assembly as described herein, e.g. wherein the optical assembly is configured as a telescope and/or beam expander in a satellite.

For the purpose of clarity and a concise description, features are described herein as part of the same or separate embodiments, however, it will be appreciated that the scope of the invention may include embodiments having combinations of all or some of the features described. For example, while embodiments were shown for optical assemblies comprising two monolithic optical components, each with a single optical surface, alternative ways may be envisaged by those skilled in the art having the benefit of the present disclosure for achieving a similar function and result. E.g. there can be more interconnected optical components, or one optical component. Each one or more component may one, two, or more optical surfaces. The various elements of the embodiments as discussed and shown offer certain advantages, such as high accuracy stable alignment. Of course, it is to be appreciated that any one of the above embodiments or processes may be combined with one or more other embodiments or processes to provide even further improvements in finding and matching designs and advantages. It is appreciated that this disclosure offers particular advantages to optical instruments that may undergo heavy vibrations such as instruments for satellites, and in general can be applied for any application wherein high accuracy, simple construction, and/or cost saving is desired.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method of manufacturing an optical assembly, the method comprising:
   forming a first optical component by rotating a first workpiece around a rotational axis while shaping its a material of the first workpiece to form:
      a first optical surface having a first curvature that is rotation symmetric around a first optical axis of the first optical surface coinciding with the rotational axis, and
      a first alignment structure having a predefined first relative position with respect to the first curvature of the first optical surface;
   forming a second optical component by rotating a second workpiece around the rotational axis while shaping its a material of the second workpiece to form:
      a second optical surface having a second curvature which that is rotation symmetric around a second optical axis of the second optical surface coinciding with the rotational axis, and
      a second alignment structure having a predefined second relative position with respect to the second curvature of the second optical surface; and
   combining the first optical component with the second optical component, the combining including connecting, by a connection between the first alignment structure and the second alignment structure, the first alignment structure with the second alignment structure,
   wherein the first optical surface is aligned with respect to the second optical surface by:
      the connection between the first alignment structure and the second alignment structure, and
      the first predefined relative position and the second predefined relative position with respect to the first optical surface and the second optical surface,
   wherein the first curvature defines a first focal point of the first optical surface,
   wherein the second curvature defines a second focal point of the second optical surface, and
   wherein the first focal point is aligned to coincide with the second focal point.

2. The method according to claim 1, wherein the first predefined relative position and the second predefined relative position with respect to the first optical surface and the second optical surface are manufactured with sub-micrometer accuracy in a single manufacturing process per respective work piece.

3. The method according to claim 1, wherein the first workpiece and the second workpiece are rotated while the material of the first workpiece and the material of the second workpiece are shaped by a cutting tool to form the respective first optical surface and second optical surface and first alignment structure and second alignment structure,
   wherein a relative position of the cutting tool with respect to the first workpiece and the second workpiece is controlled by an actuator, and
   wherein the cutting tool is moved by computer numerical control at sub-micron precision.

4. The method according to claim 1,
   wherein the first relative position includes a first radial offset of the first alignment structure with respect to the first optical axis of the first curvature;
   wherein the second relative position includes a second radial offset of the second alignment structure with respect to the second optical axis of the second curvature;
   wherein the first radial offset matches the second radial offset to align the first optical axis to coincide with the second optical axis in the optical assembly when the first alignment structure is connected, by the connection between the first alignment structure and the second alignment structure, to the second alignment structure.

5. The method according to claim 1,
   wherein the first relative position includes a first axial offset of the first alignment structure with respect to a first alignment point defined by the first curvature,
   wherein the second relative position includes a second axial offset of the second alignment structure with respect to a second alignment point defined by the second curvature,
   wherein the first axial offset matches, or has a predetermined difference, with the second axial offset to align the first optical surface with respect to the second optical surface along a coordinate on the optical axes.

6. The method according to claim 1, wherein the optical assembly is configured as part of an optical instrument wherein a light beam is reflected from the first optical surface directly to the second optical surface without an intermediate reflecting surface.

7. The method according to claim 1, wherein the first workpiece and the second workpiece are shaped from a first respective manufacturing direction and a second respective manufacturing direction, respectively, and
   wherein, in the combining of the first optical component and the second optical component to form the optical assembly, one of the first optical component and the second optical component is flipped such that the first respective manufacturing direction and the second respective manufacturing direction of the first optical component and second optical component face each other.

8. The method according to claim 1, wherein:
   the first curvature is defined by a parabolic shape rotated around a first central axis of symmetry coinciding with the first optical axis and defining a first focal point and a first vertex;
   the second curvature is defined by a parabolic shape rotated around a second central axis of symmetry coinciding with the second optical axis and defining a second focal point and a second vertex;
   a distance between the first focal point and the first vertex is larger than a distance between the second focal point and the second vertex.

9. The method according to claim 1, wherein at least one optical component, manufactured from a single work piece, comprises two or more distinct optical surfaces.

10. A computer readable storage medium with computer numerical control parameters that when executed by diamond turning system, facilitate executing a method of manufacturing an optical assembly, the method comprising:
   forming a first optical component by rotating a first workpiece around a rotational axis while shaping a material of the first workpiece to form:

a first optical surface having a first curvature that is rotation symmetric around a first optical axis of the first optical surface coinciding with the rotational axis, and a first alignment structure having a predefined first relative position with respect to the first curvature of the first optical surface;

forming a second optical component by rotating a second workpiece around the rotational axis while shaping a material of the second workpiece to form:

a second optical surface having a second curvature which is rotation symmetric around a second optical axis of the second optical surface coinciding with the rotational axis, and a second alignment structure having a predefined second relative position with respect to the second curvature of the second optical surface; and combining the first optical component with the second optical component, the combining including connecting, by a connection between the first alignment structure and the second alignment structure, the first alignment structure with the second alignment structure, wherein the first optical surface is aligned with respect to the second optical surface by:

the connection between the first alignment structure and the second alignment structure, and the first predefined relative position and the second predefined relative position with respect to the first optical surface and the second optical surface, wherein the first curvature defines a first focal point of the first optical surface, wherein the second curvature defines a second focal point of the second optical surface, and wherein the first focal point is aligned to coincide with the second focal point.

11. An optical assembly comprising:
a monolithic first optical component comprising:
a first optical surface having a first curvature that is rotation symmetric around a first optical axis of the first optical surface, and
a first alignment structure having a predefined first relative position with respect to the first curvature of the first optical surface;
a monolithic second optical component comprising:
a second optical surface having a second curvature that is rotation symmetric around a second optical axis of the second optical surface, and
a second alignment structure having a predefined second relative position with respect to the second curvature of the second optical surface;

wherein the first alignment structure is connected with the second alignment structure by a connection between the first alignment structure and the second structure, wherein the first optical surface is aligned with respect to the second optical surface by:

the connection between the first alignment structure and the second alignment structure, and the first predefined relative position and the second predefined relative position with respect to the first optical surface and the second optical surface, wherein the first curvature defines a first focal point of the first optical surface, wherein the second curvature defines a second focal point of the second optical surface, and wherein the first focal point is aligned to coincide with the second focal point.

12. The optical assembly according to claim 11, wherein the first optical surface and the second optical surface each comprise concentric micro-grooves, wherein the micro-grooves have sub-micron peak-to-valley height differences, wherein at least one of the first alignment structure and the second alignment structure comprises at least one circular rim and/or groove, and wherein the at least one circular rim and/or groove comprises edges that are concentric with the micro-grooves of the respective first optical surface and second optical surface.

13. The optical assembly according to claim 11, wherein the first optical component and the second optical component comprise respective interconnecting fixation structures such as screw holes to screw the first optical component and the second optical component together, and wherein the interconnecting fixation structures are separate from the first alignment structure and the second alignment structure.

14. The optical assembly according to claim 11, wherein the optical assembly comprises a cavity formed between the first optical component and the second optical component, wherein the cavity is formed within an intersection of the first curvature and the second curvature, and wherein the first optical component and/or second optical component comprise respective beam passages to pass a light beam between the first optical surface and second optical surface and/or between the cavity and external surroundings.

15. An optical instrument comprising the optical assembly according to claim 11, wherein the optical assembly is configured as a telescope or a beam expander.

* * * * *